US011904299B2

(12) United States Patent
Zheng et al.

(10) Patent No.: US 11,904,299 B2
(45) Date of Patent: Feb. 20, 2024

(54) TWC SYSTEM FOR FUEL CUT $NO_x$ CONTROL

(71) Applicants: BASF Corporation, Florham Park, NJ (US); Heesung Catalysts Corporation, Seoul (KR)

(72) Inventors: Xiaolai Zheng, Iselin, NJ (US); Patrick L Burk, Freehold, NJ (US); Jinwoo Song, Incheon (KR); Jun Lee, Gyeonggi-do (KR)

(73) Assignees: BASF Corporation, Florham Park, NJ (US); Heesung Catalysts Corporation, Seoul (KR)

( * ) Notice: Subject to any disclaimer, the term of this patent is extended or adjusted under 35 U.S.C. 154(b) by 486 days.

(21) Appl. No.: 17/250,187

(22) PCT Filed: Jun. 11, 2019

(86) PCT No.: PCT/IB2019/054875
§ 371 (c)(1),
(2) Date: Dec. 11, 2020

(87) PCT Pub. No.: WO2019/239325
PCT Pub. Date: Dec. 19, 2019

(65) Prior Publication Data
US 2021/0283580 A1 Sep. 16, 2021

Related U.S. Application Data

(60) Provisional application No. 62/684,070, filed on Jun. 12, 2018.

(51) Int. Cl.
*B01J 23/46* (2006.01)
*B01J 21/04* (2006.01)
*B01J 23/44* (2006.01)
*B01J 21/06* (2006.01)
*B01J 23/04* (2006.01)
*B01J 35/00* (2006.01)
*B01J 35/02* (2006.01)
*B01J 35/04* (2006.01)
*B01J 35/10* (2006.01)
*B01D 53/94* (2006.01)
*F01N 3/18* (2006.01)
*F01N 3/28* (2006.01)

(52) U.S. Cl.
CPC .......... *B01J 23/464* (2013.01); *B01D 53/945* (2013.01); *B01D 53/9422* (2013.01); *B01D 53/9468* (2013.01); *B01D 53/9477* (2013.01); *B01J 21/04* (2013.01); *B01J 21/066* (2013.01); *B01J 23/04* (2013.01); *B01J 23/44* (2013.01); *B01J 35/0006* (2013.01); *B01J 35/023* (2013.01); *B01J 35/04* (2013.01); *B01J 35/1019* (2013.01); *F01N 3/18* (2013.01); *F01N 3/2803* (2013.01); *B01D 2255/1021* (2013.01); *B01D 2255/1023* (2013.01); *B01D 2255/1025* (2013.01); *B01D 2255/2042* (2013.01); *B01D 2255/2063* (2013.01); *B01D 2255/2065* (2013.01); *B01D 2255/2068* (2013.01); *B01D 2255/2092* (2013.01); *B01D 2255/20715* (2013.01); *B01D 2255/908* (2013.01); *B01D 2255/9022* (2013.01); *B01D 2255/91* (2013.01); *B01D 2255/9155* (2013.01)

(58) Field of Classification Search
CPC ........ B01J 23/464; B01J 21/04; B01J 21/066; B01J 23/04; B01J 23/44; B01J 35/0006; B01J 35/023; B01J 35/04; B01J 35/1019; B01D 53/9422; B01D 53/945; B01D 53/9468; B01D 53/9477; B01D 2255/1021; B01D 2255/1023; B01D 2255/1025; B01D 2255/2042; B01D 2255/2063; B01D 2255/2065; B01D 2255/2068; B01D 2255/20715; B01D 2255/2092; B01D 2255/9022; B01D 2255/908; B01D 2255/91; B01D 2255/9155; F01N 3/18; F01N 3/2803
See application file for complete search history.

(56) References Cited

U.S. PATENT DOCUMENTS

| 6,471,924 | B1 | 10/2002 | Feeley et al. |
| 8,104,266 | B2 | 1/2012 | Otsuki et al. |
| 9,527,036 | B2 | 12/2016 | Schiffer et al. |
| 2008/0072578 | A1 | 3/2008 | Kumar |
| 2011/0217216 | A1 | 9/2011 | Liu |
| 2012/0128558 | A1* | 5/2012 | Nunan ............... B01J 23/42 502/339 |
| 2015/0266014 | A1* | 9/2015 | Xue ............... F01N 3/0842 502/328 |
| 2017/0320048 | A1* | 11/2017 | Xue ............... B01J 35/0006 |

(Continued)

FOREIGN PATENT DOCUMENTS

| EP | 1 265 691 B1 | 12/2002 |
| EP | 2 307 122 B1 | 4/2011 |

(Continued)

OTHER PUBLICATIONS

International Search Report dated Sep. 20, 2019 for International Application No. PCT/IB2019/054875.

(Continued)

*Primary Examiner* — Timothy C Vanoy
(74) *Attorney, Agent, or Firm* — DLA Piper LLP (US)

(57) ABSTRACT

This disclosure is directed to catalyst compositions, catalytic articles for purifying exhaust gas emissions and methods of making and using the same. In particular, the disclosure relates to a catalytic article including a catalytic material on a substrate, wherein the catalytic material has a first layer and a second layer. The first layer provides effective lean $NO_x$ trap functionality and the second layer provides effective three-way conversion of carbon monoxide, hydrocarbons, and nitrogen oxides ($NO_x$).

19 Claims, 7 Drawing Sheets

(56) References Cited

FOREIGN PATENT DOCUMENTS

| | | | |
|---|---|---|---|
| JP | 2000-510762 | A | 8/2000 |
| JP | 2008-286061 | A | 11/2008 |
| JP | 2016-502460 | A | 1/2016 |
| WO | 2011-154913 | A1 | 12/2011 |
| WO | 2017/082563 | A1 | 5/2017 |

OTHER PUBLICATIONS

Written Opinion of the International Searching Authority for International Application No. PCT/IB2019/054875.
Notice of Reasons for Refusal dated May 30, 2023, of counterpart Japanese Patent Application No. 2021-519013, along with an English translation.
Rejection Decision dated Mar. 25, 2023, of counterpart Chinese Patent Application No. 201980038438.X, along with an English machine translation.
Second Office Action dated Dec. 19, 2022, of counterpart Chinese Patent Application No. 201980038438.X, along with an English machine translation.

* cited by examiner

TWC SYSTEM FOR FUEL CUT NO$_x$ CONTROL

This application is a U.S. national phase entry under 35 U.S.C. § 371 from PCT International Application No. PCT/IB2019/054875, filed Jun. 11, 2019, which claims priority to U.S. Provisional Application No. 62/684,070, filed Jun. 12, 2018, all of which are hereby incorporated by reference in their entirety.

FIELD OF THE INVENTION

The present invention relates generally to the field of three-way conversion catalysts and their use in emission gas treatment systems to reduce hydrocarbons, carbon monoxide, and nitrogen oxides.

BACKGROUND OF THE INVENTION

Exhaust gas from vehicles powered by gasoline engines is typically treated with one or more three-way conversion (TWC) automotive catalysts, which are effective to abate nitrogen oxides (NO$_x$), carbon monoxide (CO), and hydrocarbon (HC) pollutants in the engine exhaust. For example, a typical exhaust after-treatment system for a gasoline engine consists of two TWC catalysts, namely, a first/upstream TWC catalyst mounted in a position near the exhaust manifold and the engine compartment (the close-coupled position, CC), and a second/downstream TWC catalyst placed in a position either directly next to the first TWC catalyst (the second close-coupled position, CC2) or underneath the vehicle body (the underfloor position, UF). TWC catalysts typically comprise one or more platinum group metals (PGMs), such as platinum, palladium, and/or rhodium, supported on oxygen storage components (OSCs) and/or refractory metal oxide supports.

Modern gasoline engines are equipped with electronic fuel injection and air intake systems, which feed a constantly varying air-fuel mixture that quickly and continually oscillates between lean (low fuel/high air) and rich (high fuel/low air) exhaust. This type of oscillation occurs at a relatively small amplitude around the stoichiometric air-to-fuel ratio, under the control of a computer-aid engine control unit (ECU) and on-board lambda sensors, to provide optimal reaction conditions on TWC catalysts to simultaneously convert NO$_x$, CO, and HC almost to completion.

Driven by market demands and regulation requirements, improvement of the fuel economy for internal combustion engines has been of great importance. As one of fuel-saving measures, to cut fuel injection under de-acceleration or high-speed cruise driving conditions becomes increasingly popular for the calibration of a gasoline-powered engine. A typical fuel-cut event reduces the fuel injection substantially or even to zero, while the air-intake is largely retained. Such an operation generates a very lean exhaust mixture that oxidizes the TWC catalysts in the after-treatment system. After the fuel-cut, when the engine is switched back to the oscillation mode around the stoichiometric air-to-fuel ratio, a NO$_x$ breakthrough from the TWC catalysts often occurs. This NO$_x$ slip results from a delay in regeneration of the active PGM component present in the TWC catalysts. Since emission regulations are becoming increasingly more stringent, there is a strong, continuous need to develop TWC catalysts with improved catalytic performance that can be employed in engine exhaust after-treatment systems for gasoline engines and, in particular, that can effectively function even in the context of regular fuel-cut events.

SUMMARY OF THE INVENTION

The disclosure relates to a catalytic material with three-way conversion and NO$_x$ trap functionality (referred to herein as a TWC/NT catalyst) and to a catalyst composite comprising the TWC/NT catalyst to mitigate NO$_x$ breakthrough during fuel-cut events. The TWC/NT catalyst composite generally comprises a catalytic material containing at least two layers. One layer is effective to provide lean NO$_x$ trap functionality and one layer provides effective conversion of carbon monoxide (CO), hydrocarbons (HC) and nitrogen oxides (NO$_x$). Such TWC/NT catalyst composites can be employed in exhaust treatment systems of gasoline engines allowing for fuel-cut events that increase the fuel thermal efficiency. In particular embodiments, the TWC/NT catalyst compositions and associated catalytic composite disclosed herein are effective in treating NO$_x$ slip typically associated with transition between rich and lean conditions during fuel-cut events. In some embodiments, the TWC-NT catalyst compositions provide a lower tailpipe emission of N$_2$O in comparison with conventional TWC catalysts.

In one aspect, the disclosure provides a layered catalyst composite comprising a catalytic material on a substrate, the catalytic material comprising: a first layer effective to provide lean NO$_x$ trap functionality, wherein the first layer comprises a platinum component, a first refractory metal oxide and a NO$_x$ storage component selected from the group consisting of an alkaline earth metal oxide component, a rare earth metal oxide component, or combinations thereof; and a second layer effective to provide three-way conversion (TWC) of carbon monoxide (CO), hydrocarbons (HC), and nitrogen oxides (NO$_x$), wherein the second layer comprises a rhodium component, an oxygen storage component (OSC), and a second refractory metal oxide; wherein the layered catalyst composite has a loading of about 1 g/ft$^3$ to about 50 g/ft$^3$ of platinum group metals on the substrate. The loading, in certain embodiments, is about 2 g/ft$^3$ to about 40 g/ft$^3$ or about 5 g/ft$^3$ to about 30 g/ft$^3$. In some embodiments, the layered catalyst composite has a loading of about 0.1 g/in$^3$ to about 5.0 g/in$^3$ on the substrate.

In another aspect, the disclosure provides a layered catalyst composite comprising a catalytic material on a substrate, the catalytic material comprising: a first layer effective to provide lean NO$_x$ trap functionality, wherein the first layer comprises a platinum component, a first refractory metal oxide and a NO$_x$ storage component selected from the group consisting of an alkaline earth metal oxide component, a rare earth metal oxide component, or combinations thereof; and a second layer effective to provide three-way conversion (TWC) of carbon monoxide (CO), hydrocarbons (HC), and nitrogen oxides (NO$_x$), wherein the second layer comprises a rhodium component, an oxygen storage component (OSC), and a second refractory metal oxide; wherein the layered catalyst composite has a loading of about 0.1 g/in$^3$ to about 5.0 g/in$^3$ of the catalytic material on the substrate. The washcoat loading, in certain embodiments, is about 1.0 g/in$^3$ to about 4.5 g/in$^3$ or about 2.0 g/in$^3$ to about 4.2 g/in$^3$.

The composition of the first layer in the disclosed catalyst composites can vary. In some embodiments of the present disclosure, the platinum component is impregnated on the first refractory metal oxide and wherein the platinum component-impregnated refractory metal oxide comprises the platinum component in an amount of about 0.01 wt. % to about 10 wt. %, based on the refractory metal oxide. In some embodiments, the $NO_x$ storage component is selected from barium oxide, magnesium oxide, calcium oxide, strontium oxide, ceria, gadolinia, lanthana, neodymia, praseodymia, samaria, scandia, ytterbia, yttria, and combinations thereof. In some embodiments, the $NO_x$ storage component comprises an alkaline earth metal oxide component and wherein the first layer comprises the alkaline earth metal oxide component in an amount from about 1 wt. % to about 30 wt. %.

In certain embodiments, the first layer comprises: the platinum component impregnated on the first refractory metal oxide, wherein the first refractory metal oxide comprises alumina-ceria; and barium oxide. In certain embodiments, the $NO_x$ storage component and the first refractory metal oxides are in the form of a premix comprising a $NO_x$ storage-refractory metal oxide. For example, in some embodiments, the $NO_x$ storage-refractory metal oxide is selected from baria-alumina, baria-ceria, baria-alumina-ceria, and combinations thereof. Optionally, the first layer may further comprise a platinum group metal (PGM) component selected from palladium, rhodium, and combinations thereof.

The composition of the second layer in the disclosed catalyst composites can also vary. In some embodiments, the rhodium component is impregnated on the OSC and the rhodium-impregnated OSC comprises the rhodium component an amount of about 0.01 wt. % to about 10 wt. %, based on the OSC. In some embodiments, the OSC comprises ceria. For example, the OSC in certain embodiments comprises ceria in an amount of about 1 wt. % to about 80 wt. % based on the weight of the OSC. In some embodiments, the OSC comprises ceria in combination with zirconia ($ZrO_2$), hafnia ($HfO_2$), titania ($TiO_2$), praseodymia ($Pr_6O_{11}$), yttria ($Y_2O_3$), neodymia ($Nd_2O_3$), lanthana ($La_2O_3$), gadolinium oxide ($Gd_2O_3$), or combinations thereof. In certain embodiments, the second layer comprises: the rhodium component impregnated on the OSC, wherein the OSC comprises ceria; and alumina. Optionally, the second layer may further comprise a PGM component selected from palladium, platinum, and combinations thereof.

In some embodiments, in the layered catalyst composites disclosed herein, the catalytic material comprises platinum, palladium, and rhodium, and wherein the weight ratio of platinum to palladium ranges from 1/5 to 20/1 and the weight ratio of platinum to rhodium ranges from 1/2 to 20/1. The substrate of the disclosed layered catalyst composites is, in some embodiments, a wall flow filter substrate or a flow through substrate. In some embodiments, the first layer is disposed directly on the substrate and the second layer is disposed on top of the first layer. In some embodiments, the second layer is disposed directly on the substrate and the first layer is disposed on top of the second layer.

The disclosure provides, in another aspect, a method for reducing $NO_x$ levels in an exhaust gas stream during fuel-cut events, comprising contacting the exhaust gas stream with a layered catalyst composite as disclosed herein for a time and at a temperature sufficient to reduce the level of $NO_x$ in the exhaust gas stream. In an additional aspect, the disclosure provides a method for reducing $N_2O$ levels in tailpipe exhaust, comprising contacting an exhaust gas stream with a layered catalyst composite as disclosed herein for a time and at a temperature sufficient to reduce the level of $N_2O$ in the tailpipe exhaust relative to a comparative TWC catalyst positioned further downstream.

The disclosure further provides, in another aspect, an emission treatment system comprising: an engine producing an exhaust gas stream; a TWC article positioned downstream from the engine in fluid communication with the exhaust gas stream and adapted for the abatement of CO and HC and conversion of $NO_x$ to $N_2$; and a layered catalyst composite disclosed herein positioned downstream from the TWC article. In some embodiments, the engine is a gasoline engine. The TWC article is, in certain embodiment, in a first close-coupled position and the layered catalyst composite is in a second close-coupled position or in an underfloor position.

The present disclosure includes, without limitation, the following embodiments:

Embodiment 1: A layered catalyst composite comprising a catalytic material on a substrate, the catalytic material comprising: a first layer effective to provide lean $NO_x$ trap functionality, wherein the first layer comprises a platinum component, a first refractory metal oxide and a $NO_x$ storage component selected from the group consisting of an alkaline earth metal oxide component, a rare earth metal oxide component, or combinations thereof; and a second layer effective to provide three-way conversion (TWC) of carbon monoxide (CO), hydrocarbons (HC), and nitrogen oxides ($NO_x$), wherein the second layer comprises a rhodium component, an oxygen storage component (OSC), and a second refractory metal oxide; wherein the layered catalyst composite has a loading of about 1 $g/ft^3$ to about 50 $g/ft^3$ of platinum group metals on the substrate.

Embodiment 2: The layered catalyst composite of the preceding embodiment, wherein the loading is about 2 $g/ft^3$ to about 40 $g/ft^3$.

Embodiment 3: The layered catalyst composite of any preceding embodiment, wherein the loading is about 5 $g/ft^3$ to about 30 $g/ft^3$.

Embodiment 4: The layered catalyst composite of any preceding embodiment, wherein the layered catalyst composite has a loading of about 0.1 $g/in^3$ to about 5.0 $g/in^3$ of the catalytic material on the substrate.

Embodiment 5A layered catalyst composite comprising a catalytic material on a substrate, the catalytic material comprising: a first layer effective to provide lean $NO_x$ trap functionality, wherein the first layer comprises a platinum component, a first refractory metal oxide and a $NO_x$ storage component selected from the group consisting of an alkaline earth metal oxide component, a rare earth metal oxide component, or combinations thereof; and a second layer effective to provide three-way conversion (TWC) of carbon monoxide (CO), hydrocarbons (HC), and nitrogen oxides ($NO_x$), wherein the second layer comprises a rhodium component, an oxygen storage component (OSC), and a second refractory metal oxide; wherein the layered catalyst composite has a loading of about 0.1 $g/in^3$ to about 5.0 $g/in^3$ of the catalytic material on the substrate.

Embodiment 6: The layered catalyst composite of any preceding embodiment, wherein the washcoat loading is about 1.0 $g/in^3$ to about 4.5 $g/in^3$.

Embodiment 7: The layered catalyst composite of any preceding embodiment, wherein the washcoat loading is about 2.0 $g/in^3$ to about 4.2 $g/in^3$.

Embodiment 8: The layered catalyst composite of any preceding embodiment, wherein the platinum component is impregnated on the first refractory metal oxide and wherein the platinum component-impregnated refractory metal oxide comprises the platinum component in an amount of about 0.01 wt. % to about 10 wt. %, based on the refractory metal oxide.

Embodiment 9: The layered catalyst composite of any preceding embodiment, wherein the $NO_x$ storage component is selected from barium oxide, magnesium oxide, calcium oxide, strontium oxide, ceria, gadolinia, lanthana, neodymia, praseodymia, samaria, scandia, ytterbia, yttria, and combinations thereof. Embodiment 10: The layered catalyst composite of any preceding embodiment, wherein the $NO_x$ storage component comprises an alkaline earth metal oxide component and wherein the first layer comprises the alkaline earth metal oxide component in an amount from about 1 wt. % to about 30 wt. %.

Embodiment 11: The layered catalyst composite of any preceding embodiment, wherein the first layer comprises: the platinum component impregnated on the first refractory metal oxide, wherein the first refractory metal oxide comprises alumina-ceria; and barium oxide.

Embodiment 12: The layered catalyst composite of any preceding embodiment, wherein the $NO_x$ storage component and the first refractory metal oxides are in the form of a premix comprising a $NO_x$ storage-refractory metal oxide.

Embodiment 13: The layered catalyst composite of the preceding embodiment, wherein the $NO_x$ storage-refractory metal oxide is selected from baria-alumina, baria-ceria, baria-alumina-ceria, and combinations thereof.

Embodiment 14: The layered catalyst composite of any preceding embodiment, wherein the first layer further comprises a platinum group metal (PGM) component selected from palladium, rhodium, and combinations thereof.

Embodiment 15: The layered catalyst composite of any preceding embodiment, wherein the rhodium component is impregnated on the OSC and wherein the rhodium-impregnated OSC comprises the rhodium component an amount of about 0.01 wt. % to about 10 wt. %, based on the metal oxide.

Embodiment 16: The layered catalyst composite of any preceding embodiment, wherein the OSC comprises ceria.

Embodiment 17: The layered catalyst composite of any preceding embodiment, wherein the OSC comprises ceria in an amount of about 1 wt. % to about 80 wt. % based on the weight of the OSC.

Embodiment 18: The layered catalyst composite of any preceding embodiment, wherein the OSC comprises ceria in combination with zirconia ($ZrO_2$), hafnia ($HfO_2$), titania ($TiO_2$), praseodymia ($Pr_6O_{11}$), yttria ($Y_2O_3$), neodymia ($Nd_2O_3$), lanthana ($La_2O_3$), gadolinium oxide ($Gd_2O_3$), or combinations thereof.

Embodiment 19: The layered catalyst composite of any preceding embodiment, wherein the second layer comprises: the rhodium component impregnated on the OSC, wherein the OSC comprises ceria; and alumina.

Embodiment 20: The layered catalyst composite of any preceding embodiment, wherein the second layer further comprises a PGM component selected from palladium, platinum, and combinations thereof.

Embodiment 21: The layered catalyst composite of any preceding embodiment, wherein the catalytic material comprises platinum, palladium, and rhodium, and wherein the weight ratio of platinum to palladium ranges from 1/5 to 20/1 and the weight ratio of platinum to rhodium ranges from 1/2 to 20/1.

Embodiment 22: The layered catalyst composite of any preceding embodiment, wherein the substrate is a wall flow filter substrate or a flow through substrate.

Embodiment 23: The layered catalyst composite of any preceding embodiment, wherein the first layer is disposed directly on the substrate and the second layer is disposed on top of the first layer.

Embodiment 24: The layered catalyst composite of any preceding embodiment, wherein the second layer is disposed directly on the substrate and the first layer is disposed on top of the second layer.

Embodiment 25: A method for reducing $NO_x$ levels in an exhaust gas stream during fuel-cut events, comprising contacting the exhaust gas stream with the layered catalyst composite of any preceding embodiment for a time and at a temperature sufficient to reduce the level of $NO_x$ in the exhaust gas stream.

Embodiment 26: A method for reducing $N_2O$ levels in tailpipe exhaust, comprising contacting an exhaust gas stream with the layered catalyst composite of any preceding embodiment for a time and at a temperature sufficient to reduce the level of $N_2O$ in the tailpipe exhaust relative to a comparative TWC catalyst positioned further downstream.

Embodiment 27: An emission treatment system comprising: an engine producing an exhaust gas stream; a TWC article positioned downstream from the engine in fluid communication with the exhaust gas stream and adapted for the abatement of CO and HC and conversion of $NO_x$ to $N_2$; and the layered catalyst composite of any preceding embodiment positioned downstream from the TWC article.

Embodiment 28: The emission treatment system of the preceding embodiment, wherein the engine is a gasoline engine.

Embodiment 29: The emission treatment system of any preceding embodiment, wherein the TWC article is in a first close-coupled position and the layered catalyst composite is in a second close-coupled position or in an underfloor position.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure or recited in any one or more of the claims, regardless of whether such features or elements are expressly combined or otherwise recited in a specific embodiment description or claim herein. This disclosure is intended to be read holistically such that any separable features or elements of the disclosure, in any of its aspects and embodiments, should be viewed as intended to be combinable, unless the context of the disclosure clearly dictates otherwise.

BRIEF DESCRIPTION OF THE DRAWINGS

In order to provide an understanding of embodiments of the current disclosure, reference is made to the appended drawings, which are not necessarily drawn to scale, and in which reference numerals refer to components of exemplary embodiments of the disclosure. The drawings are exemplary only, and should not be construed as limiting the disclosure.

DETAILED DESCRIPTION OF THE INVENTION

Figure 1:
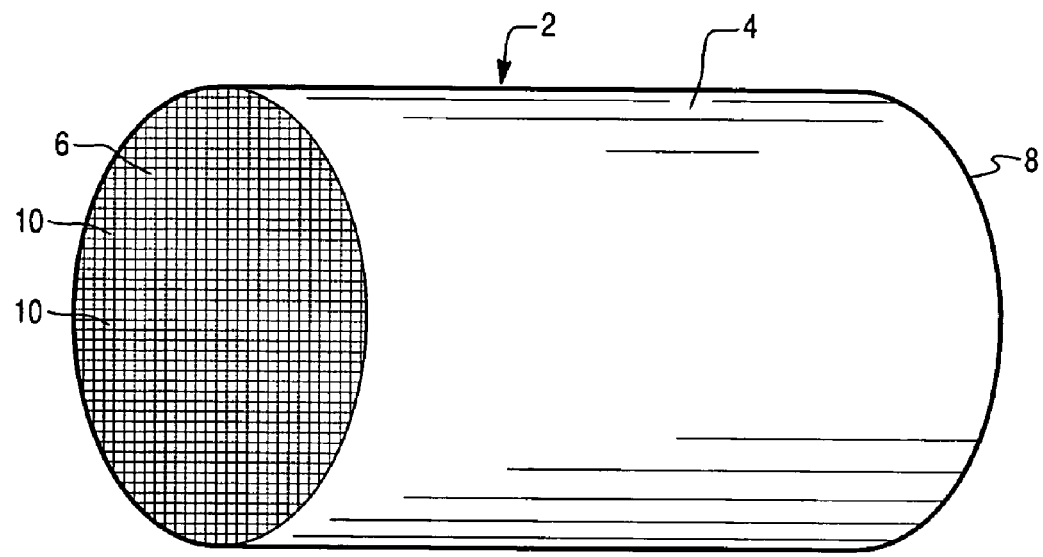
FIG. 1 is a perspective view of a honeycomb-type substrate which may comprise a catalytic article in accordance with the present disclosure.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

As used herein, the term "catalyst" or "catalyst composition" refers to a material that promotes a reaction.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a combustion engine, which may contain entrained non-gaseous components such as liquid droplets, solid particulates, and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

As used herein, the term "substrate" refers to the monolithic material onto which the catalyst composition is placed.

As used herein, the term "support" refers to any high surface area material, usually a metal oxide material, upon which a catalytic precious metal is applied.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 10%-60% by weight) of particles in a liquid vehicle, which is then coated onto a substrate and dried to provide a washcoat layer.

As used herein, the term "catalytic article" refers to an element that is used to promote a desired reaction. For example, a catalytic article may comprise a washcoat containing catalytic compositions on a substrate.

As used herein, "impregnated" or "impregnation" refers to permeation of the catalytic material into the porous structure of the support material.

The term "abatement" means a decrease in the amount, caused by any means.

Catalytic Material

The catalytic material of the disclosure includes two catalyst compositions, which can be disposed onto a substrate in a layered configuration to generate a TWC/NT catalyst composite. One layer of the catalytic material contains a first catalyst composition providing a lean $NO_x$ trap functionality, and one layer contains a second catalyst composition suitable for providing three-way conversion (TWC) of carbon monoxide (CO), hydrocarbons (HC), and nitrogen oxides ($NO_x$). The layers can be arranged in varying configurations on the substrate, as detailed below. Each catalyst composition is described in more detail fully herein below.

First Catalyst Composition

The first catalyst composition comprises a $NO_x$ storage component and at least one PGM component impregnated onto a refractory metal oxide material. As used herein, "platinum group metal" or "PGM" refers to platinum group metals or oxides thereof, including platinum (Pt), palladium (Pd), ruthenium (Ru), rhodium (Rh), osmium (Os), iridium (Ir), and combinations thereof. In some embodiments, the PGM component is platinum. In some embodiments, the PGM component is a combination of platinum and palladium. In a non-limiting example, platinum and palladium may be combined in a weight ratio of about 1:10 to about 10:0.1 or more preferably, about 1:1 to about 10:1. The concentration of the PGM component (e.g., Pt alone or in combination with Pd) can vary, but will typically be from about 0.01 wt. % to about 10 wt. % relative to the weight of the impregnated refractory metal oxide material, wherein the total impregnated refractory metal oxide material comprises the PGM component as well as the refractory metal oxide material. The amount of the impregnated refractory metal oxide material in the first composition can vary, but will typically be from about 10% to about 90%, from about 10% to about 80%, from about 10% to about 70%, from about 10% to about 60%, or from about 10% to about 50% by weight based on the weight of the first catalyst composition.

As used herein, "refractory metal oxide material" refers to a metal-containing oxide support exhibiting chemical and physical stability at high temperatures, such as the temperatures associated with gasoline and diesel engine exhaust. Exemplary refractory metal oxides include alumina, silica, zirconia, titania, ceria, and physical mixtures or chemical combinations thereof, including atomically-doped combinations. In some embodiments, the refractory metal oxide material includes, in addition to the aforementioned oxides, a metal oxide(s) of alkali, semimetal, and/or transition metal, e.g., La, Mg, Ba, Sr, Zr, Ti, Si, Ce, Mn, Nd, Pr, Sm, Nb, W, Mo, Fe, or combinations thereof. In some embodiments, the amount of such metal oxide(s) in the refractory metal oxide material can range from about 0.5% to about 70% by weight based on the total weight of the refractory metal oxide material. Exemplary combinations of metal oxides include alumina-zirconia, ceria-zirconia, alumina-ceria-zirconia, lanthana-alumina, lanthana-zirconia, lanthana-zirconia-alumina, baria-alumina, baria lanthana-alumina, baria lanthana-neodymia alumina, and alumina-ceria.

In some embodiments, high surface area refractory metal oxide supports are used, such as alumina support materials, also referred to as "gamma alumina" or "activated alumina," typically exhibit a BET surface area in excess of 60 $m^2/g$, often up to about 200 $m^2/g$ or higher. "BET surface area" has its usual meaning of referring to the Brunauer, Emmett, Teller method for determining surface area by $N_2$ adsorption. In one or more embodiments the BET surface area ranges from about 100 to about 150 $m^2/g$. Useful commercial alumina include high surface area alumina, such as high bulk density gamma-alumina, and low or medium bulk density large pore gamma-alumina. In some embodiments, the PGM component is impregnated on a single refractory metal oxide material. For example, in some embodiments, the PGM component is impregnated onto an alumina-ceria composite. In some embodiments, two or more PGM components are impregnated on the same refractory metal oxide material. For example, in some embodiments, a palladium component and a platinum component are impregnated onto the same refractory metal oxide (e.g., ceria-alumina) In some embodiments, the PGM component is impregnated on more than one refractory metal oxide. In some embodiments, two or more PGM components are impregnated on different refractory metal oxide materials.

The $NO_x$ storage component comprises an alkaline earth metal oxide component, a rare earth metal oxide component, or combinations thereof. For example, in some embodiments, the $NO_x$ storage component comprises an alkaline earth metal oxide component. The alkaline earth metal oxide component, in some embodiments, is selected from barium oxide, magnesium oxide, calcium oxide, strontium oxide, ceria, gadolinia, lanthana, neodymia, praseodymia, samaria, scandia, ytterbia, yttria, and combinations thereof. The $NO_x$ storage component is typically a basic material in nature, which may form corresponding carbonates in contact with carbon dioxide ($CO_2$) from air or an exhaust mixture. In some embodiments, the $NO_x$ storage component comprises a rare earth metal oxide component. The rare earth metal oxide component, in some embodiments, is selected from ceria, dysprosia, erbia, europia, gadolinia, holmia, lanthana, lutetia, neodymia, praseodymia, promethia, samaria, scandia, terbia, thulia, ytterbia, yttria, and combinations thereof. The amount of $NO_x$ storage component present in the first catalyst composition can vary, but will typically be from about 1 to about 30%, from about 1 to about 20%, or from about 1 to about 10% based on the weight of the first catalyst composition. In some embodiments, the $NO_x$ storage component is physically mixed with the one or more PGM-impregnated refractory metal oxide support materials in the first catalyst composition.

Second Catalyst Composition

The second catalyst composition comprises an OSC component, as defined herein, a refractory metal oxide material, and at least one PGM component. In some embodiments, the PGM component is rhodium. In some embodiments, the PGM component is a combination of rhodium and palladium. In such embodiments, the rhodium and palladium may be combined, for example, in a weight ratio of about 0.1:10 to about 10:0.1 Rh:Pd. In some embodiments, the PGM component further comprises platinum. The concentration of the PGM component (e.g., Rh alone or in combination with Pd) can vary, but will typically be from about 0.01 wt. % to about 10 wt. % relative to the weight of the impregnated refractory metal oxide material, wherein the impregnated refractory metal oxide material comprises the PGM component as well as the refractory metal oxide material.

In some embodiments, the PGM component is impregnated on a single refractory metal oxide material. For example, in some embodiments, the PGM component is impregnated onto alumina. In some embodiments, two or more PGM components are impregnated on the same refractory metal oxide material. For example, in some embodiments, a palladium component and a rhodium component are impregnated onto the same refractory metal oxide material (e.g., alumina) In some embodiments, two or more PGM components are impregnated on different refractory metal oxide materials. The amount of the PGM component impregnated refractory metal oxide material in the second catalyst composition can vary but will typically be from about 10% to about 90%, from about 10% to about 80%, from about 10% to about 70%, from about 10% to about 60%, or from about 10% to about 50% by weight based on the weight of the second catalyst composition.

As used herein, "OSC" refers to an oxygen storage component, which exhibits an oxygen storage capability and often is an entity that has multi-valent oxidation states and can actively react with oxidants such as oxygen ($O_2$) or nitric oxides ($NO_2$) under oxidative conditions, or reacts with reductants such as carbon monoxide (CO), hydrocarbons (HC), or hydrogen ($H_2$) under reduction conditions. Certain exemplary OSCs are rare earth metal oxides, which refers to one or more oxides of scandium, yttrium, and the lanthanum series defined in the Periodic Table of Elements. Examples of suitable oxygen storage components include ceria and praseodymia and combinations thereof.

In some embodiments, the OSC in the second catalyst composition includes ceria in a form that is oxidized to $Ce^{4+}$ under lean exhaust gas conditions wherein an excess amount of oxygen is present in the exhaust stream, and that releases oxygen as it is reduced to the $Ce^{3+}$ oxidation state when rich exhaust gas conditions are present. Ceria may also be used as an oxygen storage component in combination with other materials including, for example, zirconium (Zr), hafnium (Hf), titanium (Ti), lanthanum (La), praseodymium (Pr), neodymium (Nd), niobium (Nb), platinum (Pt), palladium (Pd), rhodium (Rh), iridium (Ir), osmium (Os), ruthenium (Ru), tantalum (Ta), zirconium (Zr), yttrium (Y), nickel (Ni), manganese (Mn), iron (Fe) copper (Cu), silver (Ag), gold (Au), samarium (Sm), gadolinium (Gd), and combinations comprising at least one of the foregoing metals. Various oxides (e.g., the metal in combination with oxygen (O)) may also be used, including, for example, zirconia ($ZrO_2$), hafnia ($HfO_2$), titanic. ($TiO_2$), praseodymia ($Pr_6O_{11}$), yttria ($Y_2O_3$), neodymia ($Nd_2O_3$), lanthana ($La_2O_3$), gadolinium oxide ($Gd_2O_3$), or mixtures comprising at least one of the foregoing.

The amount of ceria in a ceria-containing OSC can vary, but will typically be from about 1% to about 80%, from about 5% to about 60%, from about 5% to about 40%, from about 5% to about 30%, or from about 10% to about 25% by weight, based on the weight of the OSC.

In some embodiments, the PGM component is impregnated on an OSC component, a refractory metal oxide material, or a combination thereof. For example, in some embodiments, the PGM component is impregnated onto a ceria-zirconia based OSC component. In some embodiments, two or more PGM components are impregnated on an OSC component, a refractory metal oxide material, or a combination thereof. For example, in some embodiments, a palladium component and a rhodium component are impregnated onto the same ceria-zirconia based OSC component. The amount of the PGM component-impregnated OSC component in the second catalyst composition can vary, but will typically be from about 10% to about 90%, from about 10% to about 80%, from about 10% to about 70%, from about 10% to about 60%, or from about 10% to about 50% by weight based on the weight of the second catalyst composition.

Catalytic Article

According to one or more embodiments, the disclosed catalytic material is typically disposed on a substrate. The substrate may be constructed of any material typically used for preparing automotive catalysts and typically comprises a metal or ceramic monolithic honeycomb structure. The substrate typically provides a plurality of wall surfaces upon which washcoats comprising the catalyst compositions described herein are applied and adhered, thereby acting as a carrier for the catalyst compositions.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface of the metal substrate may be oxidized at high temperatures, e.g., 1000° C. and higher, to form an oxide layer on the surface of the substrate, improving the corrosion resistance of the alloy and facilitating adhesion of the washcoat layer to the metal surface. Ceramic materials used to construct the substrate may include any suitable refractory material, e.g., cordierite, mullite, cordierite-α alumina, silicon nitride, zircon mullite, spodumene, alumina-silica magnesia, zirconium silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the disclosure is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls.

Figure 2:
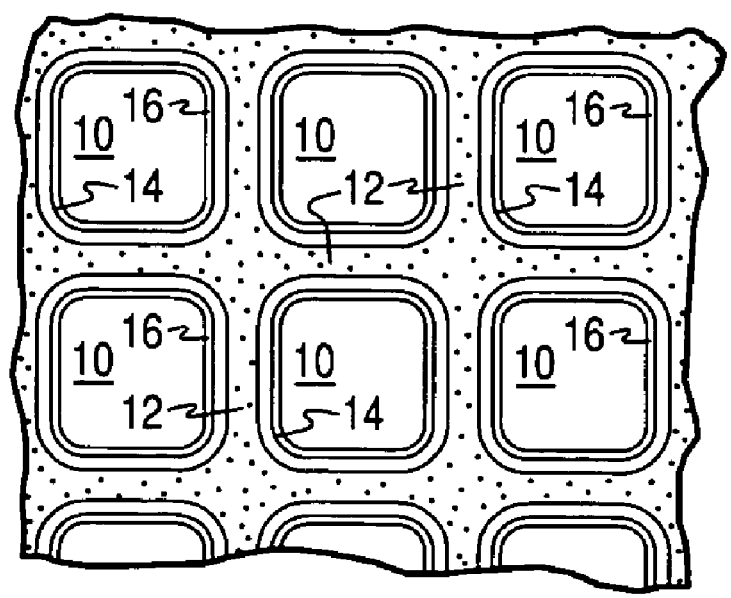
FIG. 2 is a partial cross-sectional view enlarged relative to FIG. 1 and taken along a plane parallel to the end faces of the substrate carrier of FIG. 1, which shows an enlarged view of a plurality of the gas flow passages shown in FIG. 1, in an embodiment wherein the substrate is a monolithic flow-through substrate.

FIGS. 1 and 2 illustrate an exemplary substrate 2 in the form of a flow-through substrate coated with washcoat compositions as described herein. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 2, walls 12 are so dimensioned and configured that gas flow passages 10 have a substantially regular polygonal shape. As shown, the washcoat compositions can be applied in multiple, distinct layers if desired. In the illustrated embodiment, the washcoats consist of a discrete first washcoat layer 14 adhered to the walls 12 of the substrate member and a second discrete washcoat layer 16 coated over the first washcoat layer 14. The present invention can be practiced with one or more (e.g., 2, 3, or 4) washcoat layers and is not limited to the illustrated two-layer embodiment.

For example, in one embodiment, a catalytic article comprises a catalytic material with multiple layers, wherein each layer has a different composition. For example, in some embodiments, the first layer (e.g., layer 14 of FIG. 2) comprises the first catalyst composition as disclosed herein and the second layer (e.g., layer 16 of FIG. 2) comprises the second catalyst composition as disclosed herein. In another embodiment, the first layer (e.g., layer 14 of FIG. 2) comprises the second catalyst composition disclosed herein and the second layer (e.g., layer 16 of FIG. 2) comprises the first catalyst composition disclosed herein.

Figure 3:
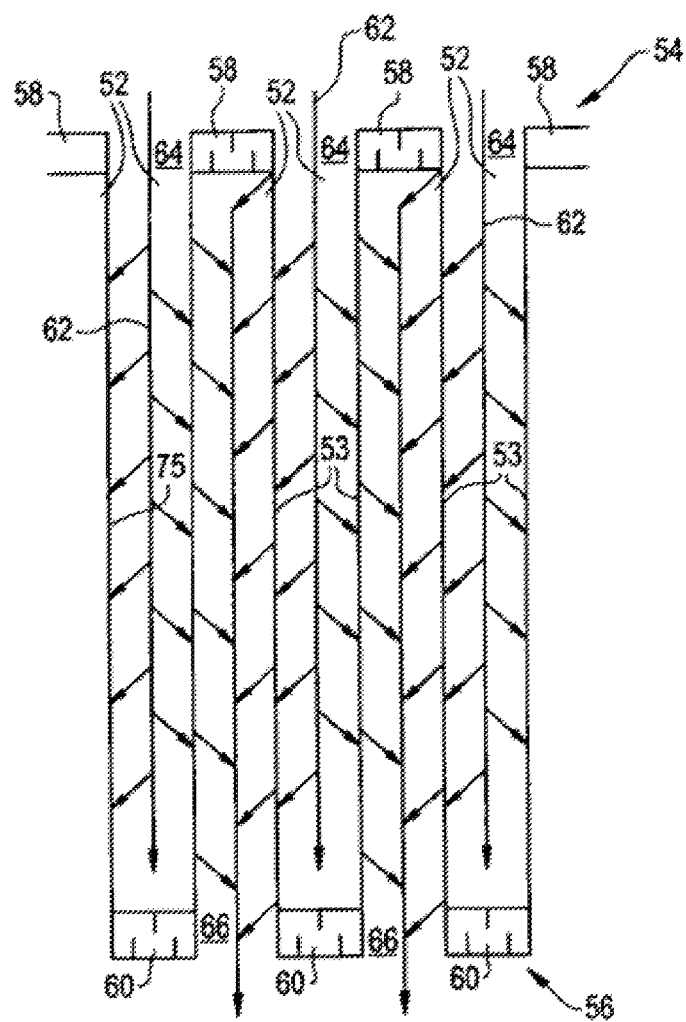
FIG. 3 is a cutaway view of a section enlarged relative to FIG. 1, wherein the honeycomb-type substrate in FIG. 1 represents a wall flow filter substrate monolith.
Figure 4:
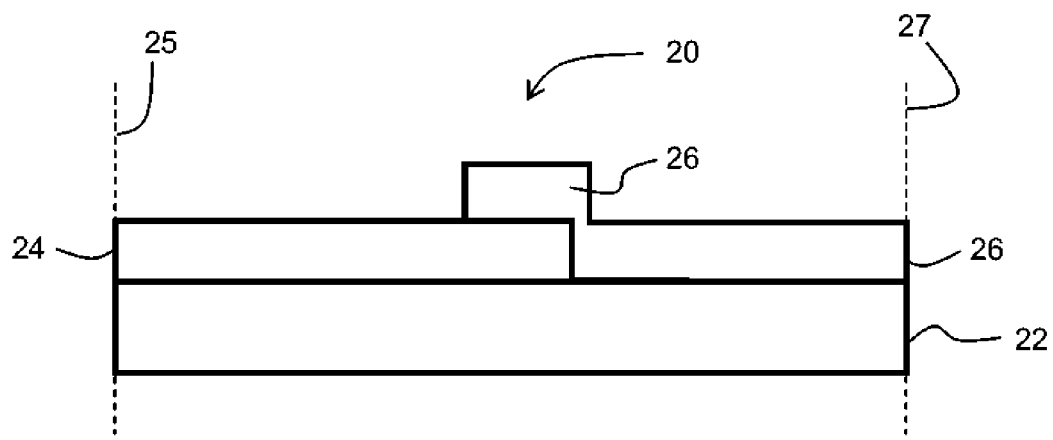
FIG. 4 is a cross-sectional view of an embodiment of a zoned catalytic article with partially overlapping layers.

FIG. 3 illustrates an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this disclosure is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

In some embodiments, the catalytic material on the substrate comprises multiple axial zones, wherein each zone has a different composition. For example, in some embodiments, the two separate washcoat compositions can be coated onto the substrate in an axially zoned configuration. In some embodiments, the same substrate can be coated once with one washcoat composition and a second time with another washcoat composition, wherein each washcoat composition is different. For example, in some embodiments, the two separate washcoat compositions may include separate catalyst compositions (i.e., a first catalyst composition and a second catalyst composition). In one embodiment, the first catalyst composition may be coated first from the filter inlet end, and the second catalyst composition may be coated second from the filter outlet end.

Exemplary zoned substrates coated with washcoat compositions such as the ones mentioned above, wherein the first washcoat composition (e.g., the first catalyst composition) is on the inlet end with washcoat coverage less than 95% of the filter length and the second washcoat composition (e.g., the second catalyst composition) is on the outlet end with washcoat coverage less than 95% of the filter length, are shown in FIGS. 4-8. For example, referring to FIG. 4, substrate 22, having an inlet end 25, an outlet end 27, and an axial length extending between the inlet end 25 and outlet end 27 contains two separate washcoat zones. A first washcoat zone 24, and a second washcoat zone 26 are applied to the substrate 22. The first washcoat zone 24 extends from the inlet end 25 and comprises the first catalyst composition and a second washcoat zone 26 extends from the outlet end 27 and comprises the second catalyst composition. In some embodiments, the first washcoat zone 24 comprises the second catalyst composition and the second washcoat zone 26 comprises the first catalyst composition. In some embodiments, the first washcoat zone 24 comprises the first catalyst composition and the second washcoat zone 26 comprises the second catalyst composition. The first washcoat zone 24 of specific embodiments extends from the front or inlet end 25 of the substrate 22 through the range of about 5% to about 95%, from about 5% to about 75%, from about 5% to about 50%, or from about 10% to about 35% of the length of the substrate 22. The second washcoat zone 26 extends from the rear of outlet end 27 of the substrate from about 5% about 95%, from about 5% to about 75%, from about 5% to about 50%, or from about 10% to about 35% of the total axial length of the substrate 22. In the embodiment shown in FIG. 4, the second washcoat zone 26 at least partially overlaps the first washcoat zone 24.

Figure 5:
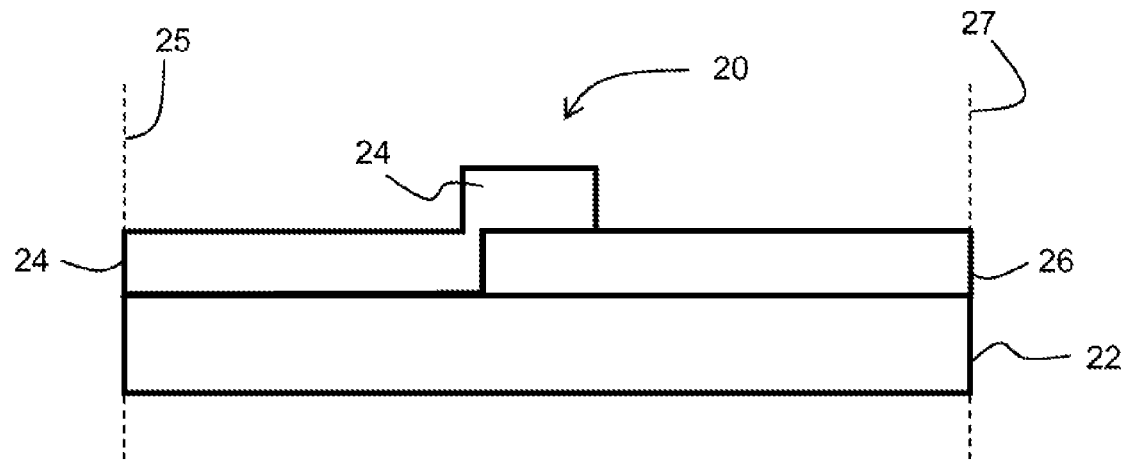
FIG. 5 is a cross-sectional view of a different embodiment of a zoned catalytic article with partially overlapping layers.

In another embodiment, as seen in FIG. 5, the first washcoat zone 24 extends from the inlet end 25 toward the outlet end 27. A second washcoat zone 26 is located adjacent and downstream from the first washcoat zone 24. The first washcoat zone 24 can at least partially overlap the second washcoat zone 26. In one embodiment, the first washcoat zone 24 comprises the first catalyst composition and the second washcoat zone 26 comprises the second catalyst composition. In some embodiments, the first washcoat zone 24 comprises the second catalyst composition and the second washcoat zone 26 comprises the first catalyst composition. The first washcoat zone 24 of specific embodiments extends from the front or inlet end 25 of the substrate 22 through the range of about 5% to about 95%, from about 5% to about 75%, from about 5% to about 50%, or from about 10% to about 35% of the length of the substrate 22. The second washcoat zone 26 extends from the rear of outlet end 27 of the substrate 22 from about 5% to about 95%, from about 5% to about 75%, from about 5% to about 50%, or from about 10% to about 35% of the total axial length of the substrate 22.

Figure 6:
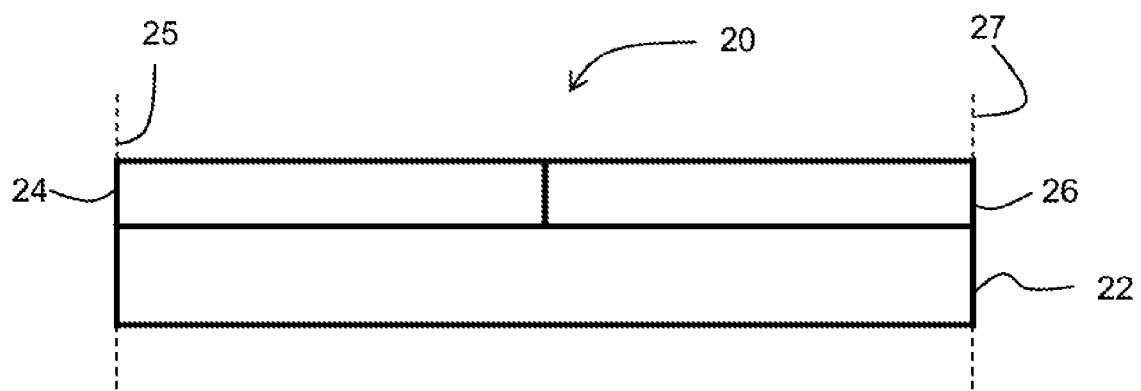
FIG. 6 is a cross-sectional view of an embodiment of a zoned catalytic article with no overlapping layers.

In another embodiment, referring to FIG. 6, the same substrate can be coated with two types of washcoat slurries in two separate zones, wherein a first washcoat zone 24 including a washcoat of a first catalyst composition and a second washcoat zone 26 includes a washcoat of a second catalyst composition are located side by side along the length of the substrate 22, with no overlap of the zones. In some embodiments, the first washcoat zone 24 comprises the second catalyst composition and the second washcoat zone 26 comprises the first catalyst composition. In some embodiments, the first washcoat zone 24 comprises the first catalyst composition and the second washcoat zone 26 comprises the second catalyst composition. The first washcoat zone 24 of specific embodiments extends from the front or inlet end 25 of the substrate 22 through the range of about 5% to about 95%, from about 5% to about 75%, from about 5% to about 50%, or from about 10% to about 35% of the length of the substrate 22. The second washcoat layer 26 extends from the rear of outlet end 27 of the substrate 22 from about 5% to about 95%, from about 5% to about 75%, from about 5% to about 50%, or from about 10% to about 35% of the total axial length of the substrate 22.

Figure 7:
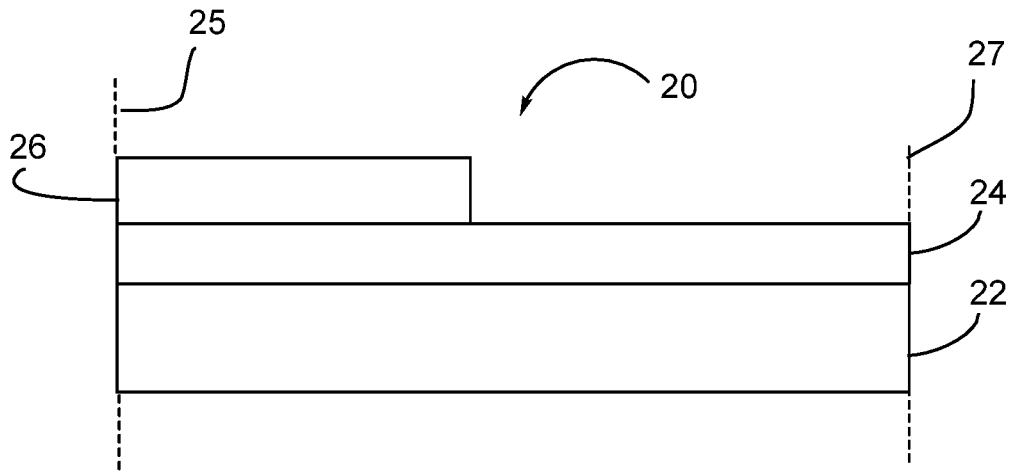
FIG. 7 is a cross-sectional view of an embodiment of a layered catalytic article.

In another embodiment, as seen in FIG. 7, a substrate 22 can be coated with a first washcoat zone 24 extending from the front or inlet end 25 of the substrate 22 to the rear or outlet end 27 of the substrate 22 and a second washcoat zone 26 that is coated over the first washcoat zone 24 proximate the front or inlet end 25 of the substrate 22 and extending across only a partial length of the substrate 22 (i.e., terminating before reaching the rear or outlet end 27 of the substrate 22). In some embodiments, the first washcoat zone 24 comprises the second catalyst composition and the second washcoat zone 26 comprises the first catalyst composition. In some embodiments, the first washcoat zone 24 comprises the first catalyst composition and the second washcoat zone 26 comprises the second catalyst composition. In specific embodiments, the second washcoat zone 26 extends from the front of inlet end 25 of the substrate 22 from about 5% to about 95%, from about 5% to about 75%, from about 5% to about 50%, or from about 10% to about 35% of the total axial length of the substrate 22. The second washcoat layer 26 extends from the rear of outlet end 27 of the substrate 22 from about 5% to about 95%, from about 5% to about 75%, from about 5% to about 50%, or from about 10% to about 35% of the total axial length of the substrate 22.

Figure 8:
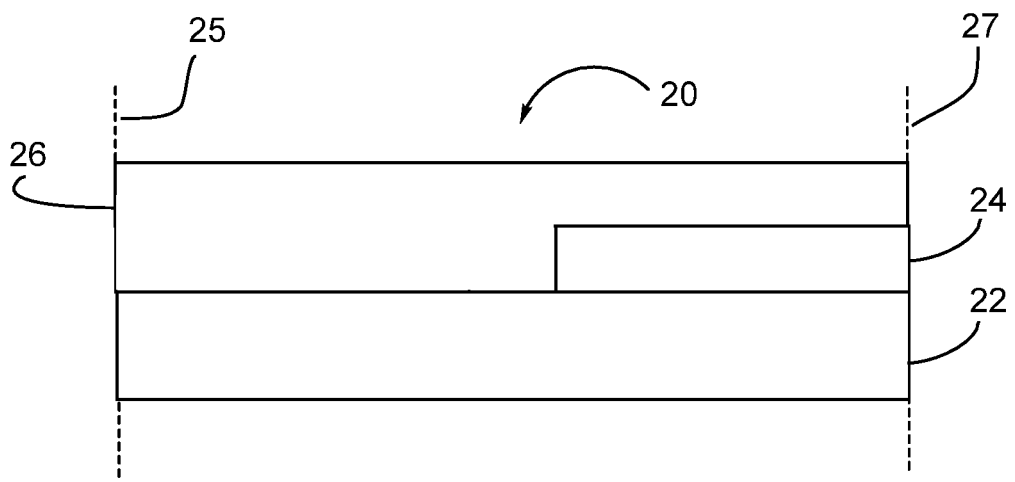
FIG. 8 is a cross-sectional view of an embodiment of a different layered catalytic article.

In another embodiment, as seen in FIG. 8, a substrate 22 can be coated with a first washcoat zone 24 proximate the rear or outlet end 25 of the substrate 22 and extending only partially along the length of the substrate 22 (i.e., terminating before reaching the front or inlet end 25 of the substrate 22). The substrate 22 can be coated with a second washcoat zone 26. In some embodiments, the first washcoat zone 24 comprises the second catalyst composition and the second washcoat zone 26 comprises the first catalyst composition. In some embodiments, the first washcoat zone 24 comprises the first catalyst composition and the second washcoat zone 26 comprises the second catalyst composition. As seen in FIG. 8, the second washcoat zone 26 extends from the front or inlet end 25 of the substrate 22 to the rear or outlet end 27 of the substrate 22 (and thus is coated completely over the first washcoat zone 26). In specific embodiments, the first washcoat zone 24 extends from the rear of outlet end 27 of the substrate 22 from about 5% to about 95%, from about 5% to about 75%, from about 5% to about 50%, or from about 10% to about 35% of the total axial length of the substrate 22.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$") are used herein to mean the weight of a component per volume of the substrate, including the volume of void spaces of the substrate. Other units of weight per volume such as g/L are also sometimes used. The total loading of the catalytic material (i.e., the platinum component impregnated on a refractory metal oxide material, and the rhodium component impregnated on the second refractory metal oxide material, and optionally one or more PGM components impregnated on one or more supports) on the catalyst substrate is typically from about 1.0 to about 5.0 g/in$^3$, more typically from about 1.0 to about 4.5 g/in$^3$, or from about 2.0 to about 4.2 g/in$^3$ for the entire catalytic article. The total loading of the active metal (i.e., PGM component) without support material is typically in the range from about 1 to about 50 g/ft$^3$, from about 2 to about 40 g/ft$^3$, or from about 5 to about 30 g/ft$^3$ for the entire catalytic article. It is noted that these weights per unit volume are typically calculated by weighting the catalyst substrate before and after treatment with the corresponding catalyst washcoat composition, and since the treatment process involves drying and calcining the catalyst substrate at high temperature, these weights represent an essentially solvent-free catalyst coating as essentially all of the water of the washcoat slurry has been removed.

Method of Making the First and Second Catalyst Compositions

Preparation of support materials impregnated with at least one PGM component, which are present in the first and second layers of the disclosed catalyst composites, are typically prepared by impregnating a support material in particulate form with an active metal solution, such as a platinum and/or rhodium and or palladium precursor solution using an incipient wetness technique.

Incipient wetness impregnation techniques, also called capillary impregnation or dry impregnation are commonly used for the synthesis of heterogeneous materials, i.e., catalysts. Typically, a metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to remove the volatile components within the solution, depositing the metal on the surface of the catalyst support. The concentration profile of the impregnated material depends on the mass transfer conditions within the pores during impregnation and drying.

For example, in some embodiments, a support material (e.g., a refractory metal oxide and/or OSC) in particulate form is impregnated with a platinum precursor solution to render a platinum component impregnated support material (which is present in the first catalyst composition of the disclosed catalyst composite). In some embodiment, another support material (e.g., a refractory metal oxide and/or OSC) in particulate form is impregnated with a rhodium precursor solution to render a rhodium component-impregnated support material (which is present in the second catalyst composition of the disclosed catalyst composite). In some embodiments, the active metals (e.g., platinum and/or rhodium) are impregnated into separate support particles.

In some embodiments, the first and/or second catalyst compositions comprise more than one PGM component impregnated on a support material. For example, the first catalyst composition and/or second catalyst composition of the catalyst composite can further comprise a palladium component impregnated onto a support material and can be prepared by impregnating a support material in particulate form with a palladium precursor solution. The support material may be the same or different than the support material of the platinum component impregnated support material (present in the first catalyst composition of the disclosed catalyst composite) and/or the support material of the rhodium component impregnated support material (present in the second catalyst composition of the disclosed catalyst composite). In some embodiments, the support material is impregnated with two different PGM precursor solutions at the same time or sequentially.

The support particles are typically dry enough to absorb substantially all of the solution to form a moist solid. Aqueous solutions of water soluble compounds or complexes of the active metal are typically utilized. For example, rhodium chloride, rhodium nitrate (e.g., $Rh(NO)_3$ and salts thereof), rhodium acetate, or combinations thereof where rhodium is the active metal, platinum nitrate, a platinum tetraamine complex, platinum acetate, or combinations thereof where platinum is the active metal, and palladium chloride, a palladium tetraamine complex, palladium acetate, or combinations thereof where palladium is the active metal.

Following treatment of the support particles with the active metal solution, the particles are dried, such as by heat treating the particles at elevated temperature (e.g., 100-150° C.) for a period of time (e.g., about 10 minutes to about 3 hours), and then calcined to convert the active metal to a more catalytically active form. An exemplary calcination process involves heat treatment in air at a temperature of about 400-600° C. for 10 min to 3 hours. The above process can be repeated as needed to reach the desired level of active metal impregnation.

In some embodiments, at least one PGM component-impregnated support material is mixed with other components of that composition as disclosed in detail above. For example, in some embodiments, the platinum component-impregnated support material is mixed with a $NO_x$ storage component (e.g., an alkaline earth metal component, such as barium oxide) and/or a palladium component-impregnated support material to provide the first catalyst composition of the disclosed catalyst composite. In another example, the rhodium component-impregnated OSC is mixed with a refractory material and/or a palladium component-impregnated refractory support material to provide the second catalyst composition of the disclosed layered catalyst composite.

Substrate Coating Process

The above-noted catalyst compositions are typically prepared in the form of catalyst particles. These catalyst particles can be mixed with water to form a slurry for purposes of coating a catalyst substrate, such as a honeycomb-type substrate. In addition to the catalyst particles, the slurry may optionally contain a binder in the form of alumina, silica, zirconium acetate, colloidal zirconia, or zirconium hydroxide, associative thickeners, and/or surfactants (including anionic, cationic, non-ionic or amphoteric surfactants). Other exemplary binders include boehmite, gamma-alumina, or delta/theta alumina, as well as silica sol. When present, the binder is typically used in an amount of about 1-10 wt. % of the total washcoat loading. Addition of acidic or basic species to the slurry can be carried out to adjust the pH accordingly. For example, in some embodiments, the pH of the slurry is adjusted by the addition of ammonium hydroxide, aqueous nitric acid, or acetic acid. A typical pH range for the slurry is about 3 to 12.

The slurry can be milled to reduce the particle size and enhance particle mixing. The milling can be accomplished in a ball mill, continuous mill, or other similar equipment, and the solids content of the slurry may be, e.g., about 20-60 wt. %, more particularly about 20-40 wt. %. In one embodiment, the post-milling slurry is characterized by a D90 particle size of about 10 to about 40 microns, preferably 10 to about 30 microns, more preferably about 10 to about 20 microns. The D90 is determined using a dedicated particle size analyzer. The equipment employed in this example uses laser diffraction to measure particle sizes in small volume slurry. The D90, typically with units of microns, means 90% of the particles by number have a diameter less than that value.

The slurry is coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied. The catalyst compositions can be applied in multiple layers with each layer having a different composition as explained above (e.g., layers 14 and 16 of FIG. 2).

Method of Hydrocarbon (HC), Carbon Monoxide (CO), and Nitrogen Oxides ($NO_x$) Conversion In general, hydrocarbons, carbon monoxide, and nitrogen oxides present in the exhaust gas stream of a gasoline or diesel engine can be converted to carbon dioxide, nitrogen, and water according to the equations shown below:

$$2CO+O_2 \rightarrow 2CO_2$$

$$C_xH_y+(x+y/2)O_2 \rightarrow xCO_2+yH_2O$$

$$2NO+2CO \rightarrow N_2+2CO_2$$

$$2NO+2H_2 \rightarrow N_2+2H_2O$$

$$NO+C_xH_y \rightarrow N_2+H_2O+CO_2$$

Typically, hydrocarbons present in an engine exhaust gas stream comprise $C_1$-$C_6$ hydrocarbons (i.e., lower hydrocarbons), although higher hydrocarbons (greater than $C_6$) can also be detected.

Aspects of the current disclosure are directed toward a method for at least partially converting HC, CO, and $NO_x$ in an exhaust gas stream during fuel-cut event, comprising contacting the exhaust gas stream with a catalytic article as described herein for a time and at a temperature sufficient to reduce the level of $NO_x$ and/or CO and/or HC. In some embodiments, the catalytic article converts hydrocarbons to carbon dioxide and water. In some embodiments, the catalytic article converts at least about 60%, or at least about 70%, or at least about 75%, or at least about 80%, or at least about 90%, or at least about 95% of the amount of hydrocarbons present in the exhaust gas stream prior to contact with the catalytic article. In some embodiment, the catalytic article converts carbon monoxide to carbon dioxide. In some embodiments, the catalytic article converts at least about 60%, or at least about 70%, or at least about 75%, or at least about 80%, or at least about 90%, or at least about 95% of the amount of carbon monoxide present in the exhaust gas stream prior to contact with the catalytic article. In some embodiment, the catalytic article converts nitrogen oxides to nitrogen. In some embodiments, the catalytic article converts at least about 60%, or at least about 70%, or at least about 75%, or at least about 80%, or at least about 90%, or at least about 95% of the amount of nitrogen oxides present in the exhaust gas stream prior to contact with the catalytic article. In some embodiment, the catalytic article converts at least about 50%, or at least about 60%, or at least about 70%, or at least about 80%, or at least about 90%, or at least about 95% of the total amount of hydrocarbons, carbon dioxide, and nitrogen oxides combined present in the exhaust gas stream prior to contact with the catalytic article.

Another aspect of the disclosure is directed toward a method for at least partially trapping $NO_x$ with a lean $NO_x$ trap. The LNT catalyst operates under cyclic lean (trapping mode) and rich (regeneration mode) exhaust conditions which can occur during fuel cutting events wherein the NO is converted to $N_2$ as shown below:

$$2NO+O_2 \rightarrow 2NO_2 \quad \text{Lean condition:}$$

$$4NO_2+2MCO_3+O_2 \rightarrow 2M(NO_3)_2+2CO_2 \quad \text{(Trapping mode)}$$

$$M(NO_3)_2+2CO \rightarrow MCO_3+NO_2+NO+CO_2 \quad \text{Rich condition:}$$

$$NO_2+CO \rightarrow NO+CO_2$$

$$2NO+2CO \rightarrow N_2+2CO_2$$

$$2NO+2H_2 \rightarrow N_2+2H_2O \quad \text{(Regeneration mode)}$$

LNT applications are typically employed for the purpose of adsorbing hydrocarbons (HC) from the engine exhaust during startup of the vehicle when the catalyst is cold and unable to oxidize the hydrocarbons to $CO_2$ (cold start). When the temperature of the exhaust increases to the point when the platinum group metal in the catalyst becomes active, hydrocarbon is released from the molecular sieve and is subsequently oxidized to $CO_2$. However, LNT systems may also be employed for the storage and release of $NO_x$ during fuel cutting events.

Engine Treatment System

The present disclosure provides an emission treatment system that incorporates the TWC/NT catalyst composite described herein, such as an emission treatment system generally comprising an engine producing an exhaust gas stream and a catalytic article of the invention positioned downstream from the engine in fluid communication with the exhaust gas stream. The engine can be a gasoline engine.

In some embodiments, the emission treatment system further comprises one or more additional catalytic components. The relative placement of the various catalytic components present within the emission treatment system can vary. For example, the treatment system can include further components, such as one or more additional three-way conversion (TWC) catalyst, hydrocarbon traps, ammonia oxidation (AMOx) materials, ammonia-generating catalysts, a selective catalytic reduction (SCR) catalyst, $NO_x$ storage and/or trapping components (LNTs), and any combination thereof. Typically, systems comprising the disclosed TWC/NT catalyst composite comprise one or more TWC catalysts. The one or more TWC catalysts are not limited in composition and can comprise any TWC catalyst composition known in the art to be suitable for TWC activity. The preceding list of components is merely illustrative and should not be taken as limiting the scope of the invention.

Figure 9:
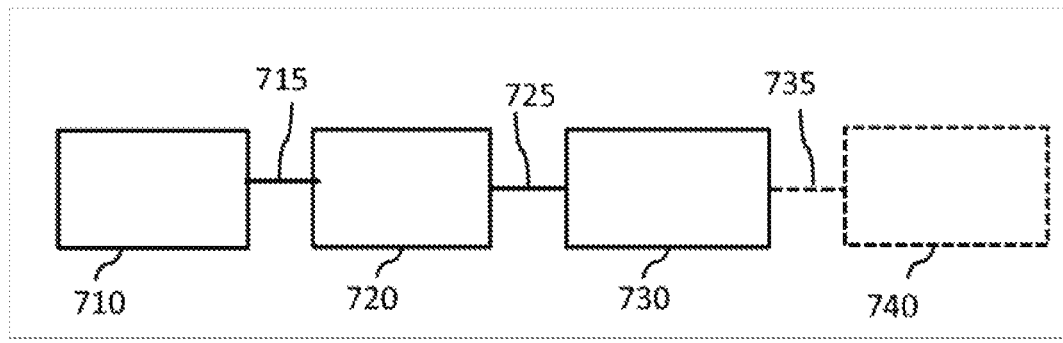
FIG. 9 is an embodiment of an engine treatment system.

Referring to FIG. 9, the engine exhaust system of one or more embodiments can comprise a three-way conversion (TWC) catalyst 720 downstream from the engine and upstream from the TWC/NT catalyst composite 730 as disclosed herein. The exhaust gas from a gasoline engine 710 is passed via an exhaust conduit 715 to TWC catalyst 720 and then is passed via conduit 725 to TWC/NT catalyst composite 730 as described herein. In one or more embodiments, the engine exhaust system 700 further comprises an optional catalyst 740 (e.g. SCR catalyst, ammonia oxidation catalyst, etc.) positioned downstream of the TWC/NT catalyst composite 730 via an exhaust conduit 735.

In one or more embodiments, the engine exhaust system comprises a TWC catalyst mounted in a position near the engine (e.g., in a close-coupled position, CC), and a TWC/NT catalytic article according to the current disclosure in a position either closely next to the TWC catalyst (in a second close-coupled position, CC2) or underneath the vehicle body (in an underfloor position, UF).

Without limitation, Table 1 presents various exhaust gas treatment system configurations of one or more embodiments. It is noted that each catalyst is connected to the next catalyst via exhaust conduits such that the engine is upstream of catalyst A, which is upstream of catalyst B, which is upstream of catalyst C:

TABLE 1

Exemplary exhaust gas treatment system general configurations

| Catalyst A | Catalyst B | Catalyst C |
|---|---|---|
| TWC (close-coupled) | Inventive TWC/NT (close-coupled) | — |
| TWC (close-coupled) | Inventive TWC/NT (underfloor) | — |
| TWC (close-coupled) | TWC (close-coupled) | Inventive TWC/NT (close-coupled) |
| TWC (close-coupled) | TWC (close-coupled) | Inventive TWC/NT (underfloor) |

As disclosed above, the catalytic articles can comprise, e.g., a wall flow filter or a flow through filter, such as for example the catalytic articles shown in the system configurations of Table 1. It is noted that in one or more embodiments, the referenced TWCs and TWC/NTs are all disposed on a flow through filter substrate. In some embodiments, one of the catalytic articles of the system comprises a wall flow filter substrate. For example, in some embodiments, the inventive TWC/NT catalyst composite can comprise the catalytic material disposed on a wall flow filter substrate.

EXAMPLES

Aspects of the current disclosure are more fully illustrated by the following examples, which are set forth to illustrate certain aspects of the present disclosure and are not to be construed as limiting.

TABLE 2

Exemplary exhaust gas treatment system specific configurations

| System | Upstream Catalyst | Downstream Catalyst | System Configuration[a] | $NO_x$ (mg/mile)[b] | NMHC (mg/mile)[b] | CO (mg/mile)[b] |
|---|---|---|---|---|---|---|
| System 1 Ref. | Ex. 1 | Comp. Ex. 2 | CC1 + CC2 (TWC + TWC) | 8.9 | 12.7 | 199 |
| System 2 | Ex. 1 | Ex. 3 | CC1 + CC2 (TWC + TWC/NT) | 5.6 | 12.5 | 176 |
| System 3 | Ex. 1 | Ex. 4 | CC1 + CC2 (TWC + TWC/NT) | 4.8 | 12.5 | 185 |
| System 4 | Ex. 1 | Ex. 5 | CC1 + CC2 (TWC + TWC/NT) | 5.2 | 12.7 | 189 |
| System 5 Ref. | Ex. 1 | Comp. Ex. 2 | CC + UF (TWC + TWC) | 11.1 | 20.3 | 1225 |
| System 6 | Ex. 1 | Ex. 4 | CC + UF (TWC + TWC/NT) | 7.4 | 21.4 | 739 |

[a]CC: Close-coupled position; CC1: First Close-coupled position; CC2: Second Close-coupled position; UF: Underfloor position.
[b]Tailpipe emissions acquired on FTP-75 tests.

Example 1

This example describes the preparation of a universal upstream TWC catalyst with a two-layer washcoat architecture and a PGM loading of 150 g/ft$^3$ (Pt/Pd/Rh=0/136.6/13.4).

Bottom Layer: The components present in the bottom layer were a 4% lanthana-stabilized gamma-alumina, a composite of ceria and zirconia with approximately 40% ceria, barium oxide, lanthanum oxide, neodymium oxide, and palladium at the concentrations of 29.3%, 56.4%, 6.8%, 1.6%, 2.3%, and 3.6%, respectively, based on the calcined weight of the bottom washcoat. The stabilized alumina and the ceria-zirconia composite were mixed with deionized water to form a slurry. Other components including promotors and stabilizers were introduced as the corresponding soluble salts. The palladium (136.6 g/ft$^3$), in the form of a palladium nitrate solution, was slowly dropped into the slurry under agitation. The pH of the slurry was adjusted to 3.5-4.5 with a diluted nitric acid solution. The slurry was milled to reduce the particle size and then coated at a washcoat loading of 2.21 g/in$^3$ onto a 4.66"×2.87" cylinder monolith substrate having a cell density of 600 cpsi (number of cells per square inch) and a wall thickness of 3.5 mil (about 100 μm). After coating, the catalyst was calcined at 550° C. for 1 hour in air.

Top Layer: The components present in the top layer were a gamma-alumina doped with 20% zirconia and 3% lanthana, a composite of ceria and zirconia with approximately 40% ceria, barium oxide, zirconium oxide, and rhodium at the concentrations of 64.0%, 30.1%, 3.9%, 1.3%, and 0.7%, respectively, based on the calcined weight of the bottom washcoat. The doped alumina and the ceria-zirconia composite were mixed with deionized water to form a slurry. Other components including promotors and stabilizers were introduced as the corresponding soluble salts. The rhodium (13.4 g/ft$^3$), in the form of a rhodium nitrate solution, was slowly dropped into the slurry under agitation. The pH of the slurry was adjusted to 4.0-4.5 with a diluted nitric acid solution. The slurry was milled to reduce the particle size and then coated at a washcoat loading of 1.16 g/in$^3$ onto the bottom layer. After coating, the catalyst was calcined at 550° C. for 1 hour in air.

Comparative Example 2

This example describes the preparation of a reference downstream TWC catalyst with a two-layer washcoat architecture and a PGM loading of 20 g/ft$^3$ (Pt/Pd/Rh=0/16/4).

Bottom Layer: The components present in the bottom layer were a refractory gamma-alumina, a composite of ceria and zirconia with approximately 30% ceria, barium oxide, lanthanum oxide, zirconium oxide, and palladium at the concentrations of 21.0%, 70.4%, 4.9%, 0.9%, 2.4%, and 0.4%, respectively, based on the calcined weight of the bottom washcoat. The alumina and the ceria-zirconia composite were mixed with deionized water to form a slurry. Other components including promotors and stabilizers were introduced as the corresponding soluble salts. The palladium (16 g/ft$^3$), in the form of a palladium nitrate solution, was slowly dropped into the slurry under agitation. The pH of the slurry was adjusted to approximately 3.5-4.5 with acetic acid. The slurry was milled to reduce the particle size and then coated at a washcoat loading of 2.06 g/in$^3$ onto a 4.66"×3.58" cylinder monolith substrate having a cell density of 600 cpsi (number of cells per square inch) and a wall thickness of 3.5 mil (about 100 μm). After coating, the catalyst was calcined at 550° C. for 1 hour in air.

Top Layer: The components present in the top layer were a refractory gamma-alumina, a composite of ceria and zirconia with approximately 10% ceria, barium oxide, zirconium oxide, and rhodium at the concentrations of 31.2%, 62.4%, 3.1%, 3.1%, and 0.15%, respectively, based on the calcined weight of the bottom washcoat. The rhodium (4 g/ft$^3$), in the form of a rhodium nitrate solution, was impregnated onto the ceria-zirconia composite to form a wet powder at the incipient wetness point. The alumina and the rhodium-impregnated ceria-zirconia composite were mixed with deionized water to form a slurry. Other components including promotors and stabilizers were introduced as the corresponding soluble salts. The pH of the slurry was adjusted to 4.0-4.5 with acetic acid. The slurry was milled to reduce the particle size and then coated at a washcoat loading of 1.60 g/in$^3$ onto the bottom layer. After coating, the catalyst was calcined at 550° C. for 1 hour in air.

Example 3

This example describes the preparation of a TWC/NT catalyst with a two-layer washcoat architecture and a PGM loading of 20 g/ft$^3$ (Pt/Pd/Rh=12/4/4).

Bottom Layer: The components present in the bottom layer were a 20% baria-doped alumina, a high surface area cerium oxide (BET surface area: 180 m$^2$/g), magnesium oxide, zirconium oxide, platinum, and palladium at the concentrations of 53.0%, 35.4%, 3.8%, 0.29%, and 0.03%, respectively, based on the calcined weight of the bottom washcoat. The platinum (12 g/ft$^3$) and palladium (1.2 g/ft$^3$), in the forms of aqueous solutions of a platinum-amine complex and palladium nitrate, respectively, were impregnated sequentially onto the baria-ceria-alumina composite to form a wet powder at the incipient wetness point. The impregnated composite was mixed with deionized water to form a slurry. Other components including promotors and stabilizers were introduced as the corresponding soluble salts. The pH of the slurry was adjusted to approximately 5.5-6.5 with acetic acid. The slurry was milled to reduce the particle size and then coated at a washcoat loading of 2.40 g/in$^3$ onto a 4.66"×3.58" cylinder monolith substrate having a cell density of 600 cpsi (number of cells per square inch) and a wall thickness of 3.5 mil (about 100 μm). After coating, the catalyst was calcined at 550° C. for 1 hour in air.

Top Layer: The components present in the top layer were a 4% lanthana-stabilized gamma-alumina, a composite of ceria and zirconia with approximately 22% ceria, barium oxide, zirconium oxide, palladium, and rhodium at the concentrations of 30.4%, 60.8%, 6.1%, 2.4%, 0.10%, and 0.14%, respectively, based on the calcined weight of the bottom washcoat. The palladium (2.8 g/ft$^3$), in the form of a palladium nitrate solution, was impregnated onto the stabilized alumina to form a wet powder at the incipient wetness point. The rhodium (4 g/ft$^3$), in the form of a rhodium nitrate solution, was impregnated onto the ceria-zirconia composite. The rhodium-impregnated ceria-zirconia composite alumina and the palladium-impregnated alumina were mixed with deionized water to form a slurry. Other components including promotors and stabilizers were introduced as the corresponding soluble salts. The pH of the slurry was adjusted to 4.0-4.5 with acetic acid. The slurry was milled to reduce the particle size and then coated at a washcoat loading of 1.64 g/in$^3$ onto the bottom layer. After coating, the catalyst was calcined at 550° C. for 1 hour in air.

Example 4

This example describes the preparation of a TWC/NT catalyst with a two-layer washcoat architecture and a PGM loading of 20 g/ft$^3$ (Pt/Pd/Rh=12/4/4).

Bottom Layer: The components present in the bottom layer were a composite of ceria and alumina (weight ratio of 1:1) doped with 10% baria, magnesium oxide, zirconium oxide, platinum, and palladium at the concentrations of 88.4%, 7.5%, 3.8%, 0.29%, and 0.03%, respectively, based on the calcined weight of the bottom washcoat. The platinum (12 g/ft$^3$) and palladium (1.2 g/ft$^3$), in the forms of aqueous solutions of a platinum-amine complex and palladium nitrate, respectively, were impregnated sequentially onto the baria-ceria-alumina composite to form a wet powder at the incipient wetness point. The impregnated composite was mixed with deionized water to form a slurry. Other components including promotors and stabilizers were introduced as the corresponding soluble salts. The pH of the slurry was adjusted to approximately 5.5-6.5 with acetic acid. The slurry was milled to reduce the particle size and then coated at a washcoat loading of 2.40 g/in$^3$ onto a 4.66"×3.58" cylinder monolith substrate having a cell density of 600 cpsi (number of cells per square inch) and a wall thickness of 3.5 mil (about 100 μm). After coating, the catalyst was calcined at 550° C. for 1 hour in air.

Top Layer: The top layer was coated with the same components and procedure to Example 3.

Example 5

This example is a TWC/NT catalyst with a two-layer washcoat architecture and a PGM loading of 10 g/ft$^3$ (Pt/Pd/Rh=5/1/4). The example was prepared flowing the same procedure to Example 4, except that the bottom layer contained 5 g/ft$^3$ platinum and 1 g/ft$^3$ palladium and the topcoat contained 4 g/ft$^3$ of Rh.

Example 6: Testing

The full size monolith catalysts were mounted in steel converter cans and aged in an exhaust line of a gasoline engine being operated under fuel-cut aging cycles. The upstream TWC catalyst, Example 1, was aged at a maximum bed temperature of 950° C. for 50 hours. The downstream catalysts were either aged at a maximum bed temperature of 935° C. for 50 hours for the CC1+CC2 applications (Table 2, Systems 1-4), or aged at a maximum bed temperature of 910° C. for 50 hours for the CC+UF applications (Table 2, Systems 5 and 6). The aged catalysts were tested on an SULEV-30 gasoline test vehicle of a 1.8 L engine displacement which was operated on US FTP-75 driving cycles following the certified procedures and tolerances. The specific FTP-75 tests adapted in the study contained approximately 42 fuel-cut events during de-acceleration or cruise operations on the vehicle.

Figure 10:
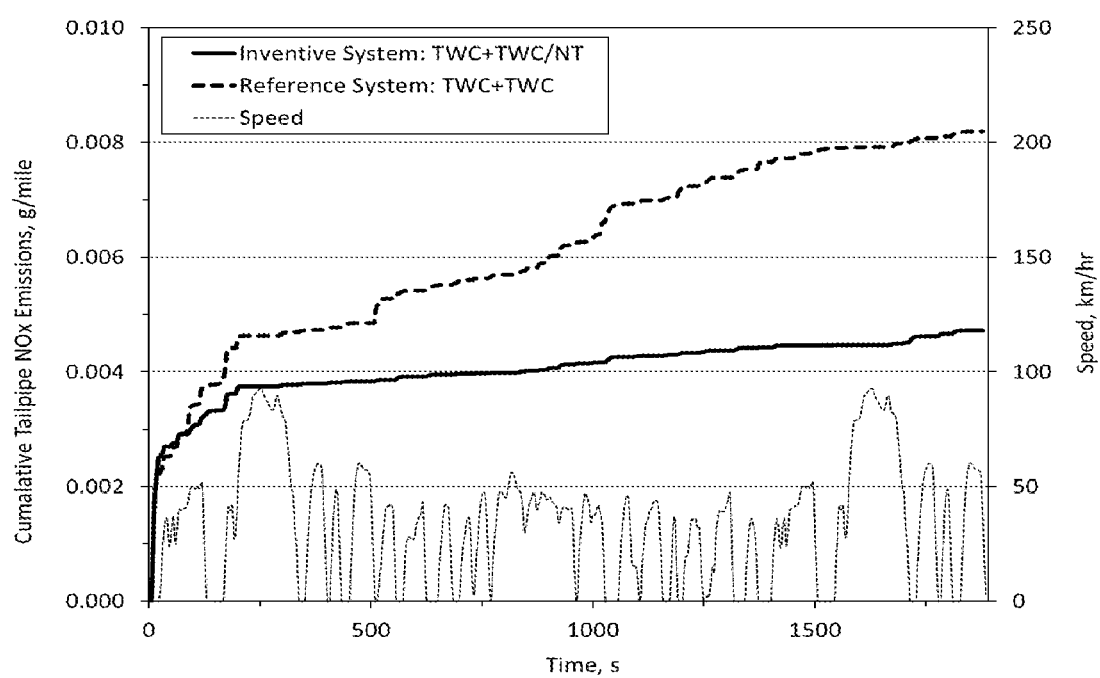
FIG. 10 is a line graph showing cumulative tailpipe $NO_x$ emission traces of an inventive catalyst system containing a TWC-NT catalytic article and a comparative catalyst system.
Figure 11:
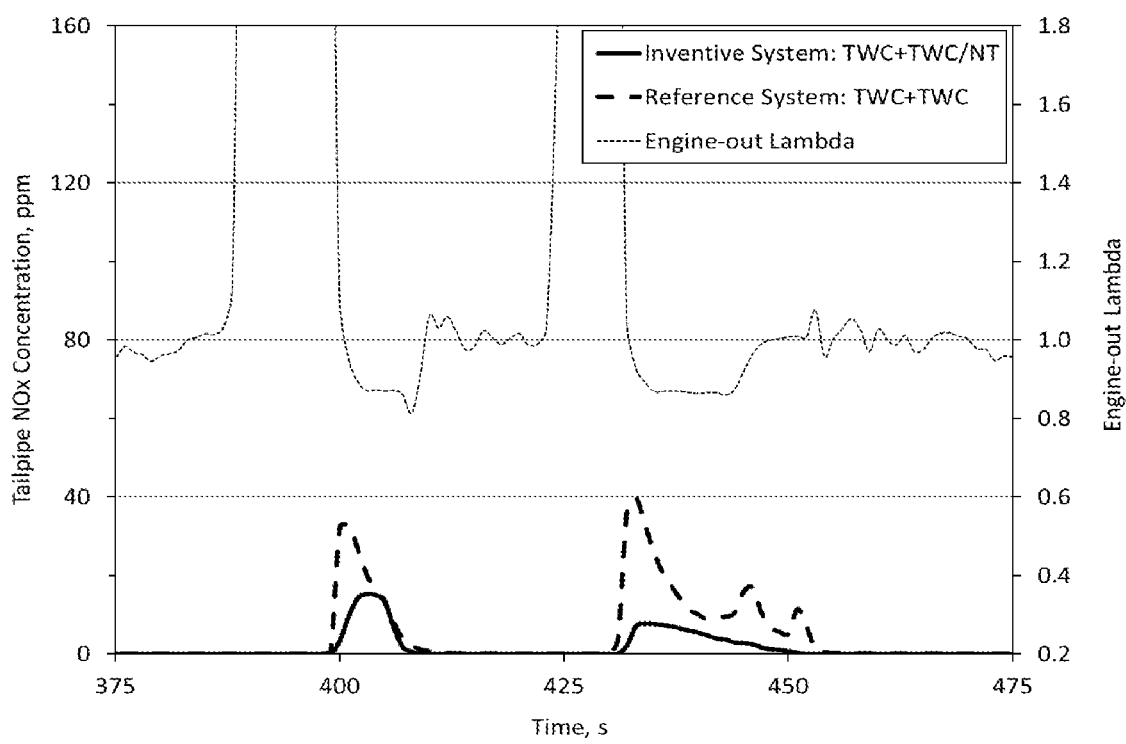
FIG. 11 is a line graph showing tailpipe $NO_x$ emission traces of an inventive catalyst system containing a TWC-NT catalytic article and a comparative catalyst system during the time period of 475 sec in FTP-75 with two representative fuel-cut events.

The tailpipe bag emissions on the FTP-75 tests are compiled in Table 2. Under the CC1+CC2 catalyst configuration, Reference System 1 with Comparative Example 2 (TWC, 20 g/ft$^3$ PGM at Pt/Pd/Rh=0/16/4) as a CC2 catalyst gave 8.9 mg/mile of NO$_x$ at tailpipe. Systems 2 and 3 with an inventive TWC/NT (20 g/ft$^3$ PGM at Pt/Pd/Rh=12/4/4) as a CC2 catalyst decreased the tailpipe NO$_x$ emissions to 4.8-5.6 mg/mile, indicating a reduction of 37-46% NO$_x$ emissions. Whereas the tailpipe NMHC performance is comparable, the inventive systems showed a moderately better CO performance compared to the reference system. The modal data of the cumulative tailpipe NO$_x$ emissions of a reference system and an invention system are illustrated in FIG. 10, in good agreement with the aforementioned bag data. FIG. 11 plots a representative range of the NO$_x$ concentration traces (in ppm) as a function of the test time (in second), which clearly indicates the occurrence of NO$_x$ benefit during the fuel-cut events. System 4 utilized Example 4 (10 g/ft$^3$ PGM at Pt/Pd/Rh=5/1/4) as the CC2 catalyst, an inventive TWC/NT catalyst of 50% less in PGM in reference to Comparative Example 1. The NO$_x$ benefit was largely retained for System 4, indicating the potential of the TWC/NT catalyst for the cost reduction.

Under the CC+UF catalyst configuration, Reference System 5 with Comparative Example 2 as an UF catalyst gave 11.2 mg/mile of NO$_x$ at tailpipe. In comparison, Inventive Systems 6 with TWC/NT Example 4 as an UF catalyst decreased the tailpipe NO$_x$ emissions to 7.4 mg/mile. In addition, the TWC/NT catalyst substantially outperformed the conventional TWC benefit in CO emissions.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

That which is claimed is:

1. A layered catalyst composite comprising a catalytic material on a substrate, the catalytic material comprising:
    a first layer effective to provide lean NO$_x$ trap functionality, wherein the first layer comprises a platinum component, a first refractory metal oxide, and a NO$_x$ storage component comprising an alkaline earth metal oxide component, a rare earth metal oxide component, or combinations thereof; and
    a second layer effective to provide three-way conversion (TWC) of carbon monoxide (CO), hydrocarbons (HC), and nitrogen oxides (NO$_x$), wherein the second layer comprises a rhodium component, an oxygen storage component (OSC), and a second refractory metal oxide,
    wherein the layered catalyst composite has a loading of about 1 g/ft$^3$ to about 50 g/ft$^3$ of platinum group metals on the substrate, and
    the first layer comprises:
    the platinum component impregnated on the first refractory metal oxide, wherein the first refractory metal oxide comprises alumina-ceria; and barium oxide.

2. The layered catalyst composite of claim 1, wherein the layered catalyst composite has a loading of about 0.1 g/in$^3$ to about 5.0 g/in$^3$ of the catalytic material on the substrate.

3. The layered catalyst composite of claim 1, wherein the platinum component is impregnated on the first refractory metal oxide and wherein the platinum component-impregnated refractory metal oxide comprises the platinum component in an amount of about 0.01 wt. % to about 10 wt. %, based on the weight of the first refractory metal oxide.

4. The layered catalyst composite of claim 1, wherein the NO$_x$ storage component is selected from barium oxide, magnesium oxide, calcium oxide, strontium oxide, ceria, gadolinia, lanthana, neodymia, praseodymia, samaria, scandia, ytterbia, yttria, and combinations thereof.

5. The layered catalyst composite of claim 1, wherein the $NO_x$ storage component comprises an alkaline earth metal oxide component and wherein the first layer comprises the alkaline earth metal oxide component in an amount from about 1 wt. % to about 30 wt. %.

6. The layered catalyst composite of claim 1, wherein the $NO_x$ storage component and the first refractory metal oxide are in the form of a premix comprising a $NO_x$ storage-refractory metal oxide.

7. The layered catalyst composite of claim 6, wherein the $NO_x$ storage-refractory metal oxide is selected from baria-alumina, baria-ceria, baria-alumina-ceria, and combinations thereof.

8. The layered catalyst composite of claim 1, wherein the first layer further comprises a platinum group metal (PGM) component selected from palladium, rhodium, and combinations thereof.

9. The layered catalyst composite of claim 1, wherein the rhodium component is impregnated on the OSC and wherein the rhodium-impregnated OSC comprises the rhodium component in an amount of about 0.01 wt. % to about 10 wt. %, based on the weight of the OSC.

10. The layered catalyst composite of claim 1, wherein the OSC comprises ceria in an amount of about 1 wt. % to about 80 wt. % based on the weight of the OSC.

11. The layered catalyst composite of claim 1, wherein the OSC comprises ceria in combination with zirconia ($ZrO_2$), hafnia ($HfO_2$), titania ($TiO_2$), praseodymia ($Pr_6O_{11}$), yttria ($Y_2O_3$), neodymia ($Nd_2O_3$), lanthana ($La_2O_3$), gadolinium oxide ($Gd_2O_3$), or combinations thereof.

12. The layered catalyst composite claim 1, wherein the second layer comprises:
the rhodium component impregnated on the OSC, wherein the OSC comprises ceria; and
alumina.

13. The layered catalyst composite of claim 1, wherein the second layer further comprises a PGM component selected from palladium, platinum, and combinations thereof.

14. The layered catalyst composite of claim 1, wherein the catalytic material comprises platinum, palladium, and rhodium, and wherein the weight ratio of platinum to palladium ranges from 1/5 to 20/1 and the weight ratio of platinum to rhodium ranges from 1/2 to 20/1.

15. The layered catalyst composite of claim 1, wherein the substrate is a wall flow filter substrate or a flow through substrate.

16. A layered catalyst composite comprising a catalytic material on a substrate, the catalytic material comprising:
a first layer effective to provide lean $NO_x$ trap functionality, wherein the first layer comprises a platinum component, a first refractory metal oxide, and a $NO_x$ storage component comprising an alkaline earth metal oxide component, a rare earth metal oxide component, or combinations thereof; and
a second layer effective to provide three-way conversion (TWC) of carbon monoxide (CO), hydrocarbons (HC), and nitrogen oxides ($NO_x$), wherein the second layer comprises a rhodium component, an oxygen storage component (OSC), and a second refractory metal oxide,
wherein the layered catalyst composite has a loading of about 0.1 $g/in^3$ to about 5.0 $g/in^3$ of the catalytic material on the substrate, and
the first refractory metal oxide comprises alumina-ceria and barium oxide.

17. A method for reducing $NO_x$ levels in an exhaust gas stream during fuel-cut events, comprising contacting the exhaust gas stream with a layered catalyst composite of claim 1 for a time and at a temperature sufficient to reduce the level of $NO_x$ in the exhaust gas stream.

18. A method for reducing $N_2O$ levels in tailpipe exhaust, comprising contacting an exhaust gas stream with a layered catalyst composite for a time and at a temperature sufficient to reduce the level of $N_2O$ in the tailpipe exhaust relative to a comparative TWC catalyst positioned further downstream,
wherein the layered catalyst composite comprises a catalytic material on a substrate, the catalytic material comprising:
a first layer effective to provide lean NOx trap functionality, wherein the first layer comprises a platinum component, a first refractory metal oxide, and a NOx storage component comprising an alkaline earth metal oxide component, a rare earth metal oxide component, or combinations thereof; and
a second layer effective to provide three-way conversion (TWC) of carbon monoxide (CO), hydrocarbons (HC), and nitrogen oxides (NOx), wherein the second layer comprises a rhodium component, an oxygen storage component (OSC), and a second refractory metal oxide,
wherein the layered catalyst composite has a loading of about 1 g/ft3 to about 50 g/ft3 of platinum group metals on the substrate.

19. An emission treatment system comprising:
an engine producing an exhaust gas stream;
a TWC article positioned downstream from the engine in fluid communication with the exhaust gas stream and adapted for the abatement of CO and HC and conversion of $NO_x$ to $N_2$; and
a layered catalyst composite positioned downstream from the TWC article,
wherein the layered catalyst composite comprises a catalytic material on a substrate, the catalytic material comprising:
a first layer effective to provide lean $NO_x$ trap functionality, wherein the first layer comprises a platinum component, a first refractory metal oxide, and a $NO_x$ storage component comprising an alkaline earth metal oxide component, a rare earth metal oxide component, or combinations thereof; and
a second layer effective to provide three-way conversion (TWC) of carbon monoxide (CO), hydrocarbons (HC), and nitrogen oxides ($NO_x$), wherein the second layer comprises a rhodium component, an oxygen storage component (OSC), and a second refractory metal oxide,
wherein the layered catalyst composite has a loading of about 1 $g/ft^3$ to about 50 $g/ft^3$ of platinum group metals on the substrate.

* * * * *